(12) United States Patent
Bennett et al.

(10) Patent No.: US 12,260,375 B2
(45) Date of Patent: Mar. 25, 2025

(54) SYSTEM AND METHOD FOR HIRING USERS

(71) Applicant: B-EQL Software Solutions LLC, Prosper, TX (US)

(72) Inventors: Mildred Bennett, Prosper, TX (US); Mathew Bennett, Prosper, TX (US)

( * ) Notice: Subject to any disclaimer, the term of this patent is extended or adjusted under 35 U.S.C. 154(b) by 237 days.

(21) Appl. No.: 18/075,661

(22) Filed: Dec. 6, 2022

(65) Prior Publication Data

US 2023/0177468 A1 Jun. 8, 2023

Related U.S. Application Data

(60) Provisional application No. 63/286,950, filed on Dec. 7, 2021.

(51) Int. Cl.

| | |
|---|---|
| *G06Q 10/1053* | (2023.01) |
| *G06Q 10/10* | (2023.01) |
| *G06Q 10/105* | (2023.01) |
| *G06Q 30/08* | (2012.01) |
| *G06T 19/00* | (2011.01) |
| *H04N 21/472* | (2011.01) |
| *H04N 21/81* | (2011.01) |

(52) U.S. Cl.
CPC ....... *G06Q 10/1053* (2013.01); *G06T 19/006* (2013.01); *H04N 21/47217* (2013.01); *H04N 21/816* (2013.01)

(58) Field of Classification Search
CPC .............. G06Q 10/1053; G06T 19/006; H04N 21/47217; H04N 21/816

USPC .................................................. 705/1.1–912
See application file for complete search history.

(56) References Cited

U.S. PATENT DOCUMENTS

| | | | |
|---|---|---|---|
| 8,831,999 B2 * | 9/2014 | Bolton | H04N 21/44218 705/320 |
| 2002/0055866 A1 * | 5/2002 | Dewar | G06Q 10/0639 705/7.38 |
| 2003/0071852 A1 * | 4/2003 | Stimac | G06Q 10/1053 715/810 |
| 2007/0038636 A1 * | 2/2007 | Zanghi | G06Q 10/10 |

(Continued)

OTHER PUBLICATIONS

PR Newswire, TwitterJobSearch.com adds video CV support: New service from TwitterJobSearch uses seesmic video to enable job seekers to attach a video CV directly to job posts. (Jul. 9, 2009). (Year: 2009).*

(Continued)

*Primary Examiner* — Jonathan P Ouellette

(57) ABSTRACT

The system renders a candidate registration user interface (UI) on a first display to receive a first set of registration details associated with a first user. The system renders a cover letter UI on the first display to receive cover letter data in an audio, or a video format, associated with the first user and may render a pitch room UI on the first display to receive pitch data in the video format, associated with the first user. The system provides the first set of registration details, the cover letter data and the pitch data on a second display associated with a second user and renders a decision UI on the second display to receive an input from the second user that corresponds to a decision associated with the hiring of the first user, based on the first set of registration details, the cover letter data, or the pitch data.

20 Claims, 10 Drawing Sheets

(56) References Cited

U.S. PATENT DOCUMENTS

| | | | |
|---|---|---|---|
| 2007/0190504 A1* | 8/2007 | Schwartz | G09B 19/00 |
| | | | 434/219 |
| 2011/0145161 A1* | 6/2011 | Scarborough | G06Q 10/0639 |
| | | | 705/321 |
| 2013/0282605 A1* | 10/2013 | Noelting | G06Q 50/01 |
| | | | 705/321 |
| 2014/0317009 A1* | 10/2014 | Bilodeau | G06Q 10/1053 |
| | | | 705/321 |
| 2015/0142685 A1* | 5/2015 | Willis | G06Q 10/1053 |
| | | | 705/321 |
| 2015/0154564 A1* | 6/2015 | Moon | G06Q 10/1053 |
| | | | 705/321 |
| 2015/0199646 A1* | 7/2015 | Taylor | G06Q 10/1053 |
| | | | 705/321 |
| 2015/0262130 A1* | 9/2015 | Taylor | G06F 16/24578 |
| | | | 705/321 |
| 2019/0026006 A1* | 1/2019 | Ezzeddine | G11B 27/036 |
| 2022/0366484 A1* | 11/2022 | McDonald | G06Q 30/08 |
| 2022/0374592 A1* | 11/2022 | Glase | G06F 3/04842 |
| 2022/0374838 A1* | 11/2022 | Houston | G06Q 10/1053 |

OTHER PUBLICATIONS

Nelson, T. (Jan. 6, 2014). Connecting job seekers, employers; mandeep SodhiAEs multimedia job application platform, jobma, lets candidates post video pitches with traditional resumes to present a aeholisticAE view of their skills. Star Tribune (Minneapolis, MN) (Year: 2014).*

* cited by examiner

SYSTEM AND METHOD FOR HIRING USERS

TECHNOLOGICAL FIELD

The present disclosure generally relates to a digital hiring platform, and particularly relates to systems and methods for hiring of users.

BACKGROUND

Typically, organizations utilize a hiring process to select suitable candidates. The conventional hiring process may include shortlisting resumes of a number of candidates. The conventional hiring process may further include scheduling a plurality of interview rounds with the candidates having their resumes shortlisted. The plurality of interview rounds may be, for example, via a digital setup or an in-person setup where the candidates may need to physically visit the organization.

In many instances, the resumes may miss some relevant information about the candidates. In such a case, the organization may miss the suitable candidate in the first place. Further, the setting up and going through the plurality of interview rounds may be a tedious and a lengthy process for both the candidate and the organization. Furthermore, a skillset required in the suitable candidate by the organization may not be analyzed accurately by the organization by relying only on the resumes and the conventional plurality of interview rounds. Also, the setting up of the plurality of interview rounds may be a cost ineffective process for the organization. Moreover, the conventional multi-step hiring process may still lead to selection of unsuitable candidates that may further lead to wastage of resources for the organization.

Therefore, there is a need for an improved system and method for hiring of users, such as the candidates.

BRIEF SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Some example embodiments disclosed herein provide a system for hiring users. The system comprises a memory configured to store computer-executable instructions and at least one processor configured to execute the instructions to render a candidate registration user interface (UI) on a first display to receive a first set of registration details associated with a first user. A format of the first set of registration details corresponds to at least one of a text format, an image format, or a document-based format. At least one processor may be further configured to render a cover letter UI on the first display to receive at least cover letter data associated with the first user. The format of the cover letter data corresponds to at least one of: an audio, or a video. At least one processor may be further configured to render a pitch room UI on the first display to receive at least pitch data associated with the first user. The format of the pitch data corresponds to at least the video. At least one processor may be further configured to provide the received first set of registration details, the cover letter data and the pitch data on a second display associated with a second user. At least one processor may be further configured to render a decision UI on the second display to receive at least an input from the second user. The input corresponds to a decision associated with the hiring of the first user, based on at least one of the received first set of registration details, the cover letter data, or the pitch data.

According to some example embodiments, at least one processor may be further configured to receive an information document associated with the first user via a first UI element of the candidate registration UI. At least one processor may be further configured to retrieve the first set of registration details associated with the first user from the received information document. At least one processor may be further configured to receive an input corresponding to acceptance, rejection or modification of the retrieved first set of registration details via a second UI element of the candidate registration UI.

According to some example embodiments, the candidate registration UI further comprises a third UI element corresponding to the cover letter UI and a fourth UI element corresponding to the pitch room UI.

According to some example embodiments, the rendered cover letter UI further comprises one or more details of the received first set of registration details associated with the first user. The format of one or more details is the text format.

According to some example embodiments, at least one processor is further configured to render the pitch room UI on the first display to receive industry relevant data associated with the first user. The format of the industry relevant data corresponds to at least the video.

According to some example embodiments, the rendered cover letter UI further comprises a playback UI element. At least one processor may be further configured to receive an input, via the playback UI element to modify the received cover letter data associated with the first user.

According to some example embodiments, at least one processor may be further configured to render the pitch room UI as a virtual reality (VR) environment. At least one processor may receive at least pitch data that comprises at least a VR object associated with the first user in the rendered pitch room UI.

According to some example embodiments, at least one processor may be further configured to generate a notice of decision based on the input received from the second user on the rendered decision UI. The notice of decision corresponds to at least one of: selection of the first user, rejection of the first user or decision of the selection or the rejection of the first user on hold. At least one processor may provide the generated notice of decision to the first display.

According to some example embodiments, at least one processor may be further configured to provide an onboarding UI element on the second display, to initiate a process of onboarding of the first user, based on a determination that the generated notice of decision that corresponds to the selection of the first user is accepted by the first user.

According to some example embodiments, at least one processor may be further configured to render a document upload UI to receive at least one or more documents associated with the first user, based on a determination that the generated notice of decision corresponds to at least one of the selections of the first user or the decision of the selection or the rejection of the first user is on hold.

According to some example embodiments, at least one processor may be further configured to generate a notification based on a determination that at least pitch data associated with the first user is accessed by the second user. At least one processor may provide the generated notification on the first display.

According to some example embodiments, at least one processor may be further configured to render a fifth UI element corresponding to suggestions for uploading at least pitch data associated with the first user.

According to some example embodiments, at least one processor may be further configured to render a client registration UI on the second display to receive a second set of registration details associated with the second user.

Some example embodiments disclosed herein provide a method for hiring users. The method may include rendering a candidate registration user interface (UI) on a first display to receive a first set of registration details associated with a first user. A format of the first set of registration details corresponds to at least one of a text format, an image format, or a document-based format. The method may further include rendering a cover letter UI on the first display to receive at least cover letter data associated with the first user. The format of the cover letter data corresponds to at least one of: an audio, or a video. The method may further include rendering a pitch room UI on the first display to receive at least pitch data associated with the first user. The format of the pitch data corresponds to at least the video. The method may further include providing the received first set of registration details, the cover letter data and the pitch data on a second display associated with a second user. The method may further include rendering a decision UI on the second display to receive at least an input from the second user. The input corresponds to a decision associated with the hiring of the first user, based on at least one of the received first set of registration details, the cover letter data, or the pitch data.

According to some example embodiments, the method further may include reception of an information document associated with the first user via a first UI element of the candidate registration UI. The method may further include retrieval of the first set of registration details associated with the first user from the received information document. The method may further include reception of an input corresponding to acceptance, rejection or modification of the retrieved first set of registration details via a second UI element of the candidate registration UI.

According to some example embodiments, the method may further include rendering the pitch room UI for the first display for receiving industry relevant data associated with the first user. The format of the industry relevant data corresponding to at least the video.

According to some example embodiments, the method may further include rendering the pitch room UI as a virtual reality (VR) environment. The method may further include receiving at least pitch data that comprising at least a VR object associated with the first user in the rendering pitch room.

According to some example embodiments, the method may further include generating a notice of decision based on the input received from the second user on the rendering decision UI. The notice of decision corresponding to at least one of selection of the first user, rejection of the first user or decision of the selection or the rejection of the first user on hold. The method may further include providing the generated notice of decision to the first display.

According to some example embodiments, the method may further include generating a notification based on a determination that at least pitch data associated with the first user is accessed by the second user. The method may further include providing the generated notification on the first display.

Some example embodiments disclosed herein provide a computer programmable product comprising a non-transitory computer readable medium having stored thereon computer executable instruction which when executed by one or more processors, cause one or more processors to carry out operations for hiring users. The operations may include rendering a candidate registration user interface (UI) on a first display to receive a first set of registration details associated with a first user. A format of the first set of registration details corresponds to at least one of a text format, an image format, or a document-based format. The operations may further include rendering a cover letter UI on the first display to receive at least cover letter data associated with the first user. The format of the cover letter data corresponds to at least one of: an audio, or a video. The operations may further include rendering a pitch room UI on the first display to receive at least pitch data associated with the first user. The format of the pitch data corresponds to at least the video. The operations may further include providing the received first set of registration details, the cover letter data and the pitch data on a second display associated with a second user. The operations may further include rendering a decision UI on the second display to receive at least an input from the second user. The input corresponds to a decision associated with the hiring of the first user, based on at least one of the received first set of registration details, the cover letter data, or the pitch data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
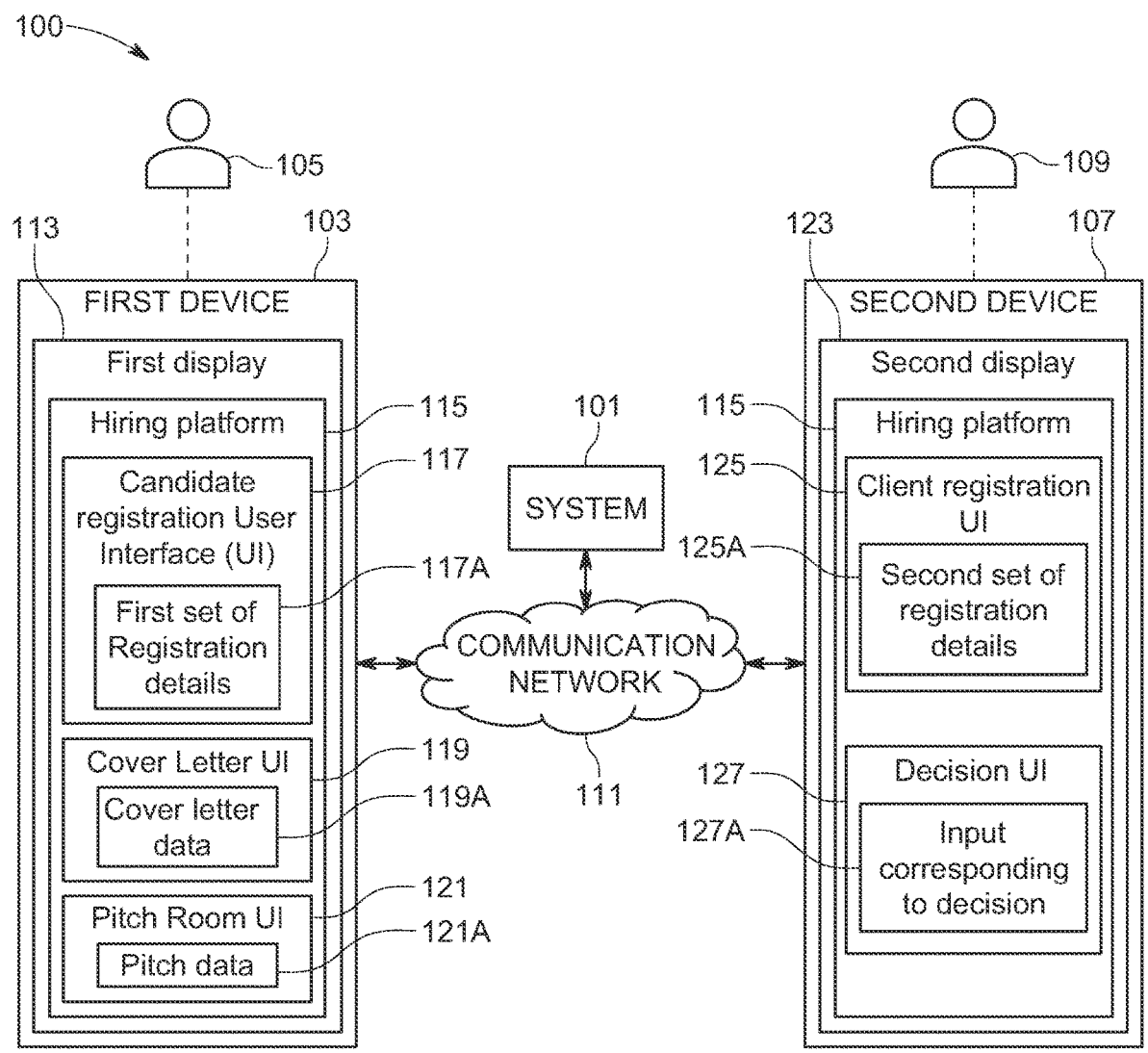
Figure 2:
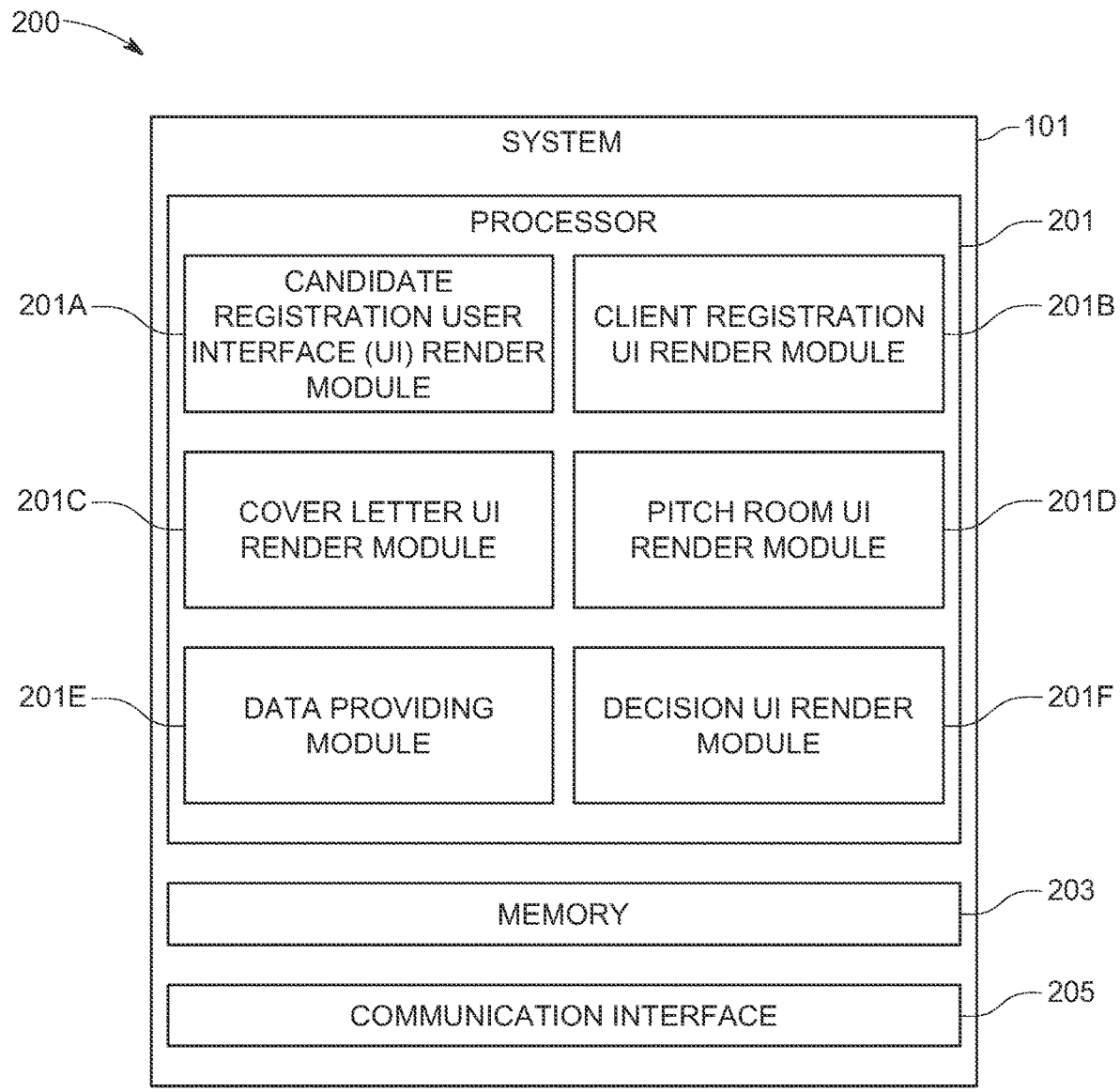
Figure 3A:
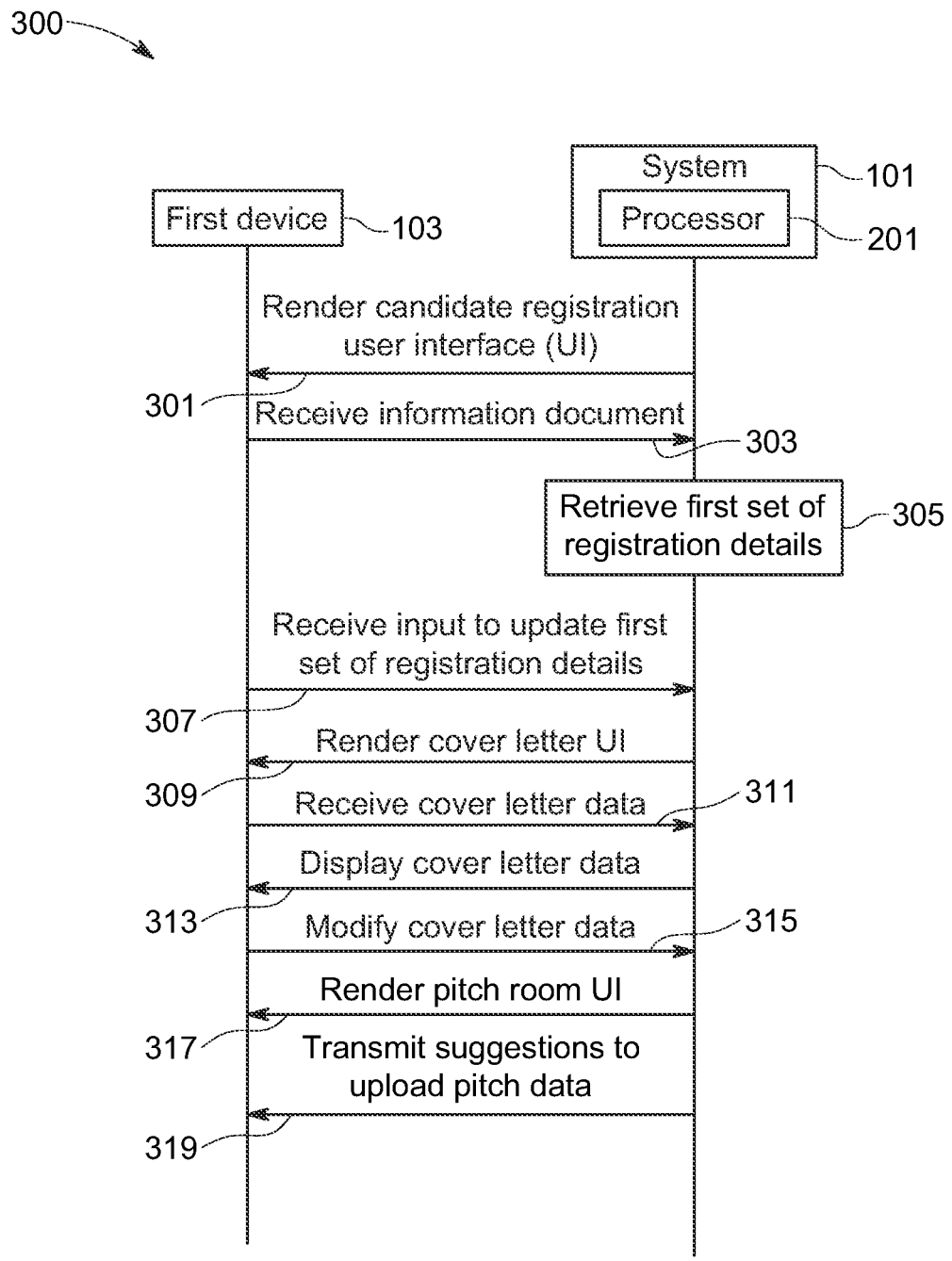
Figure 3B:
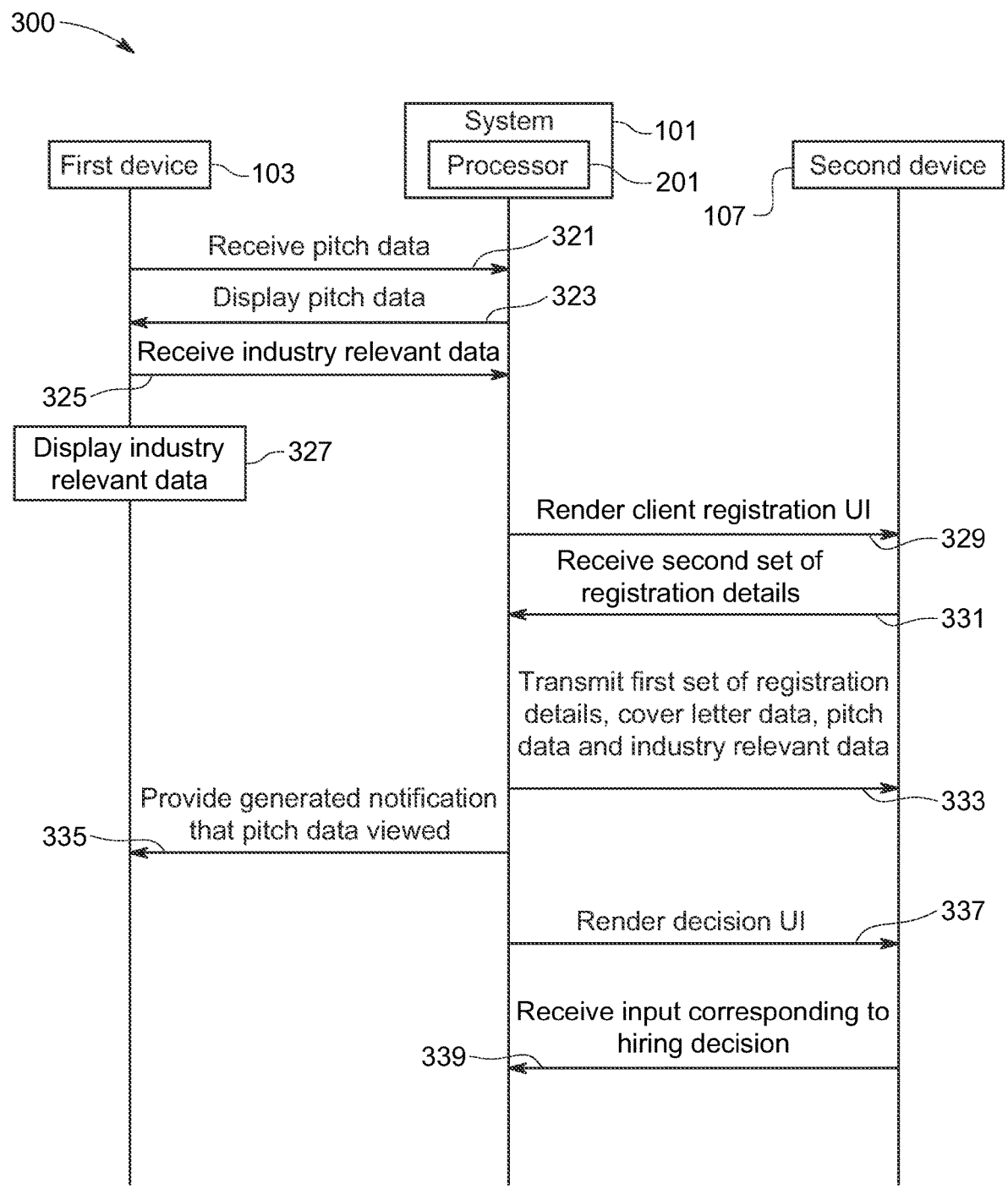
Figure 3C:
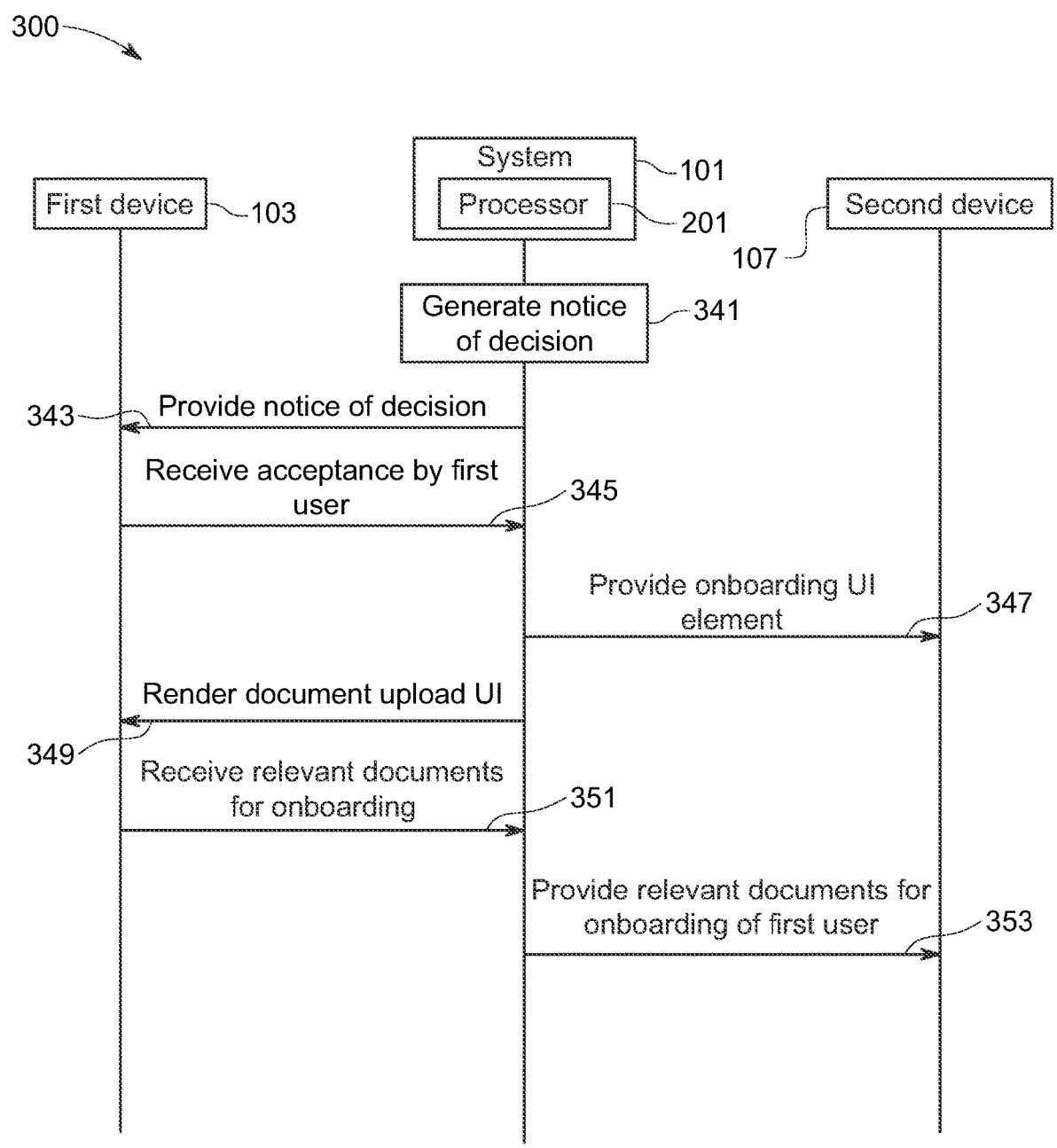
Figure 4A:
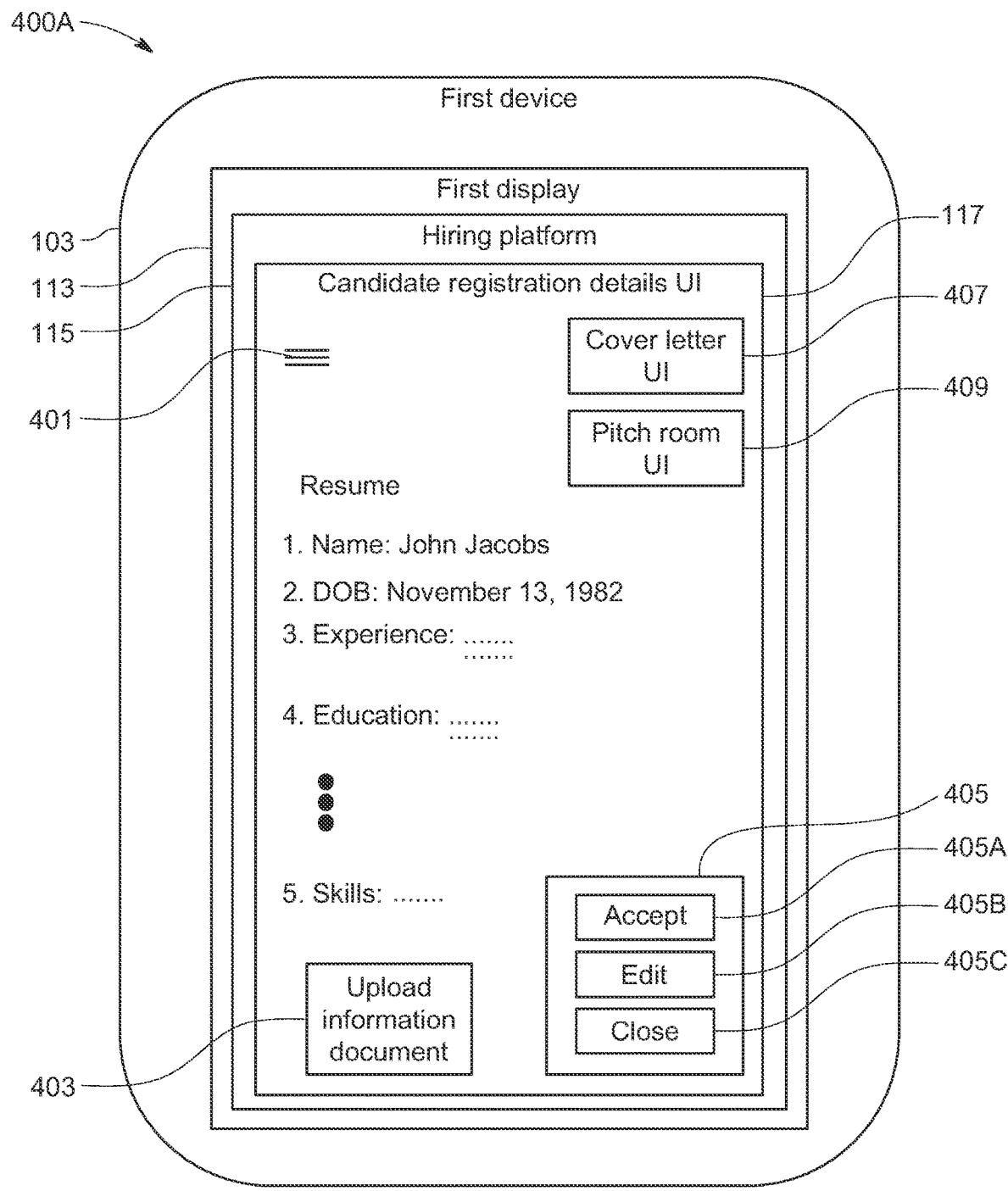
Figure 4B:
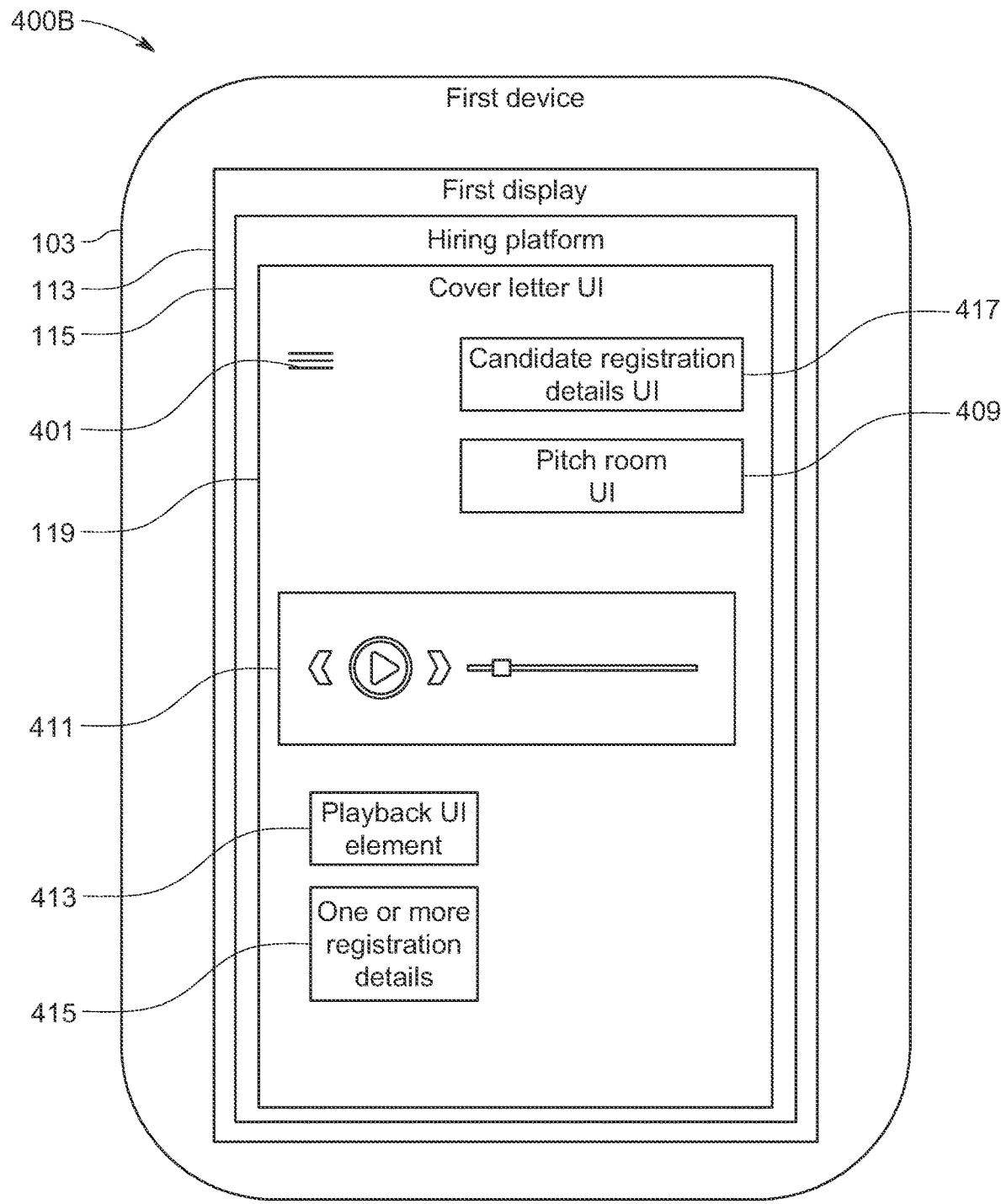
Figure 4C:
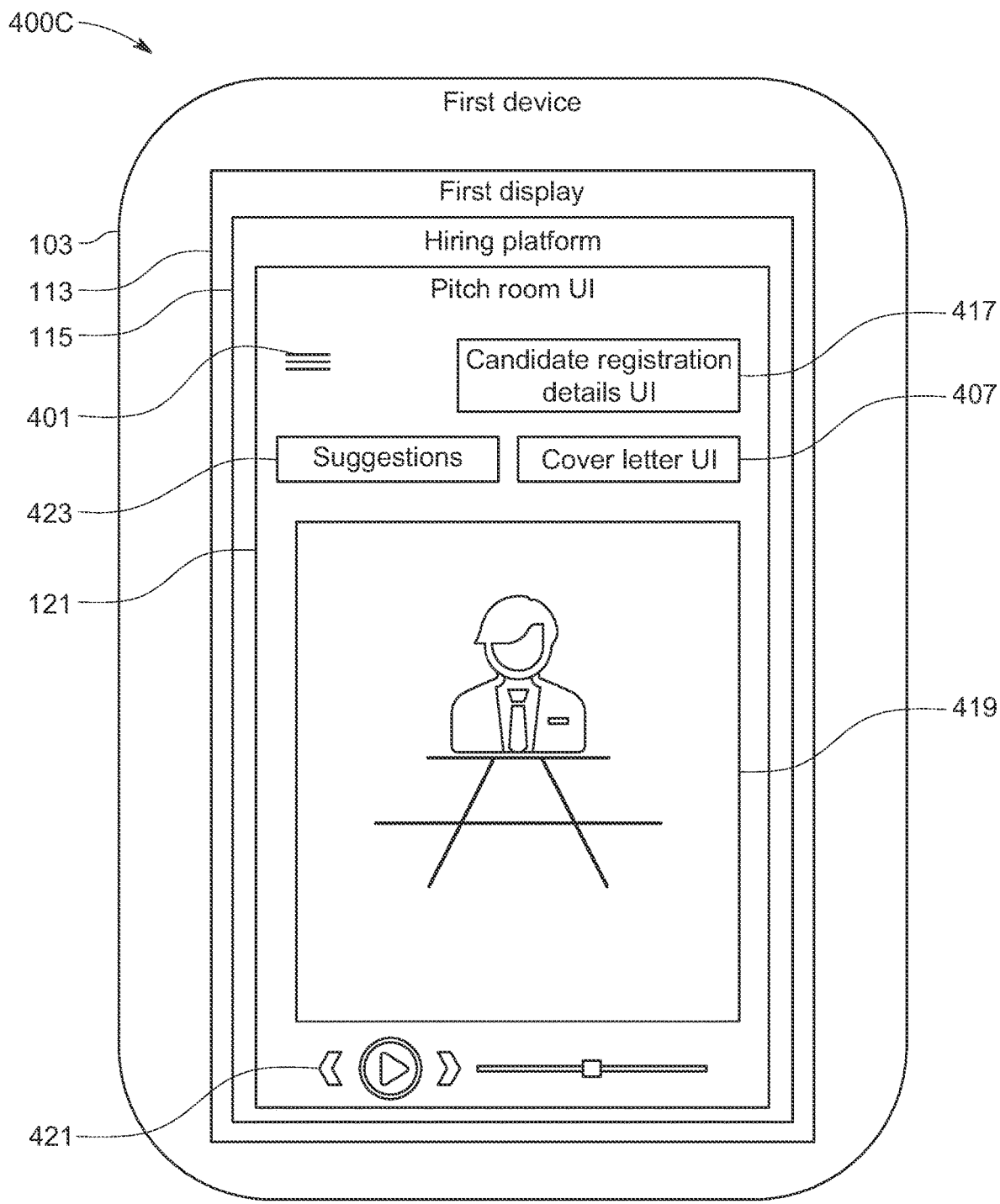
Figure 4D:
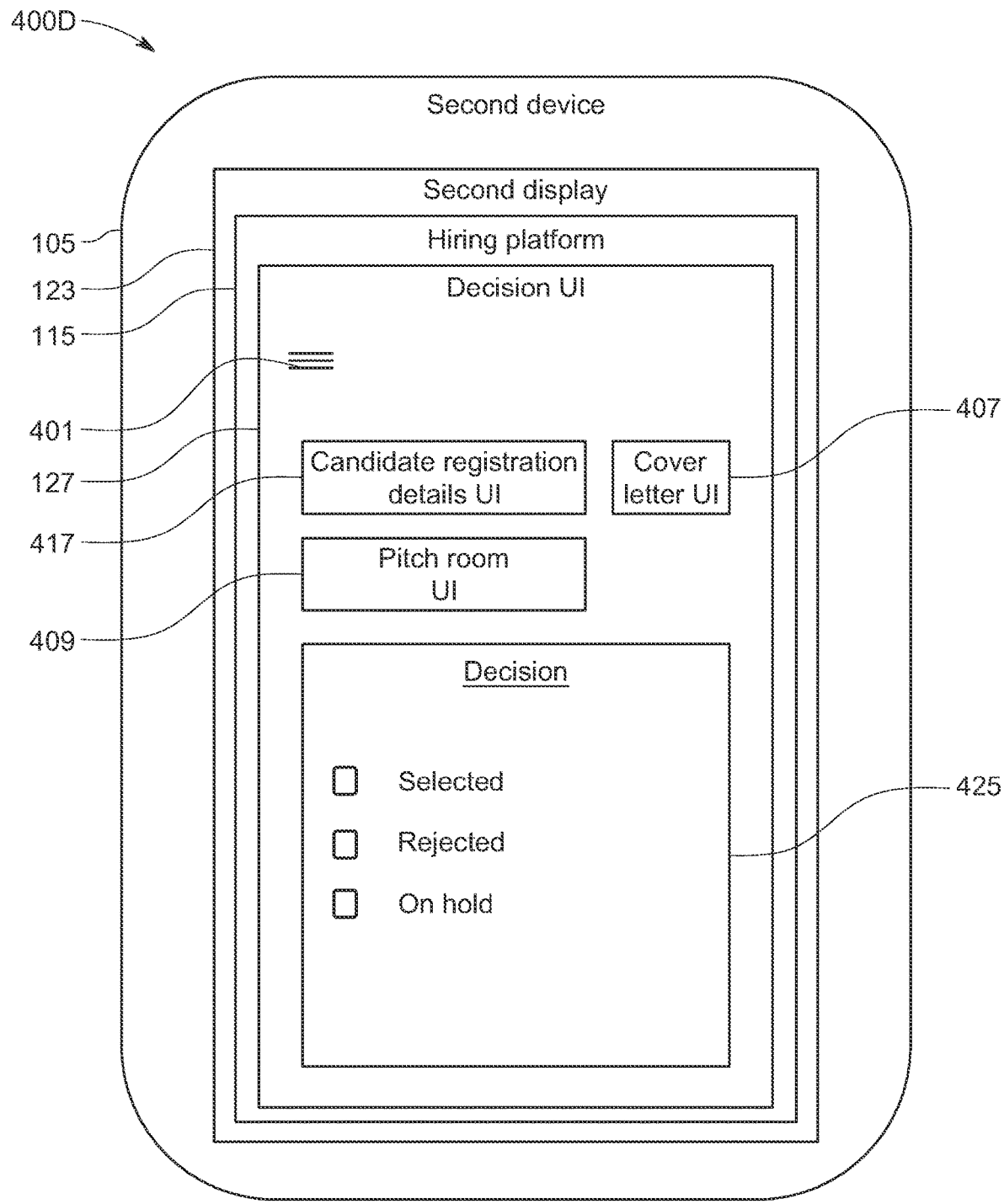
Figure 5:
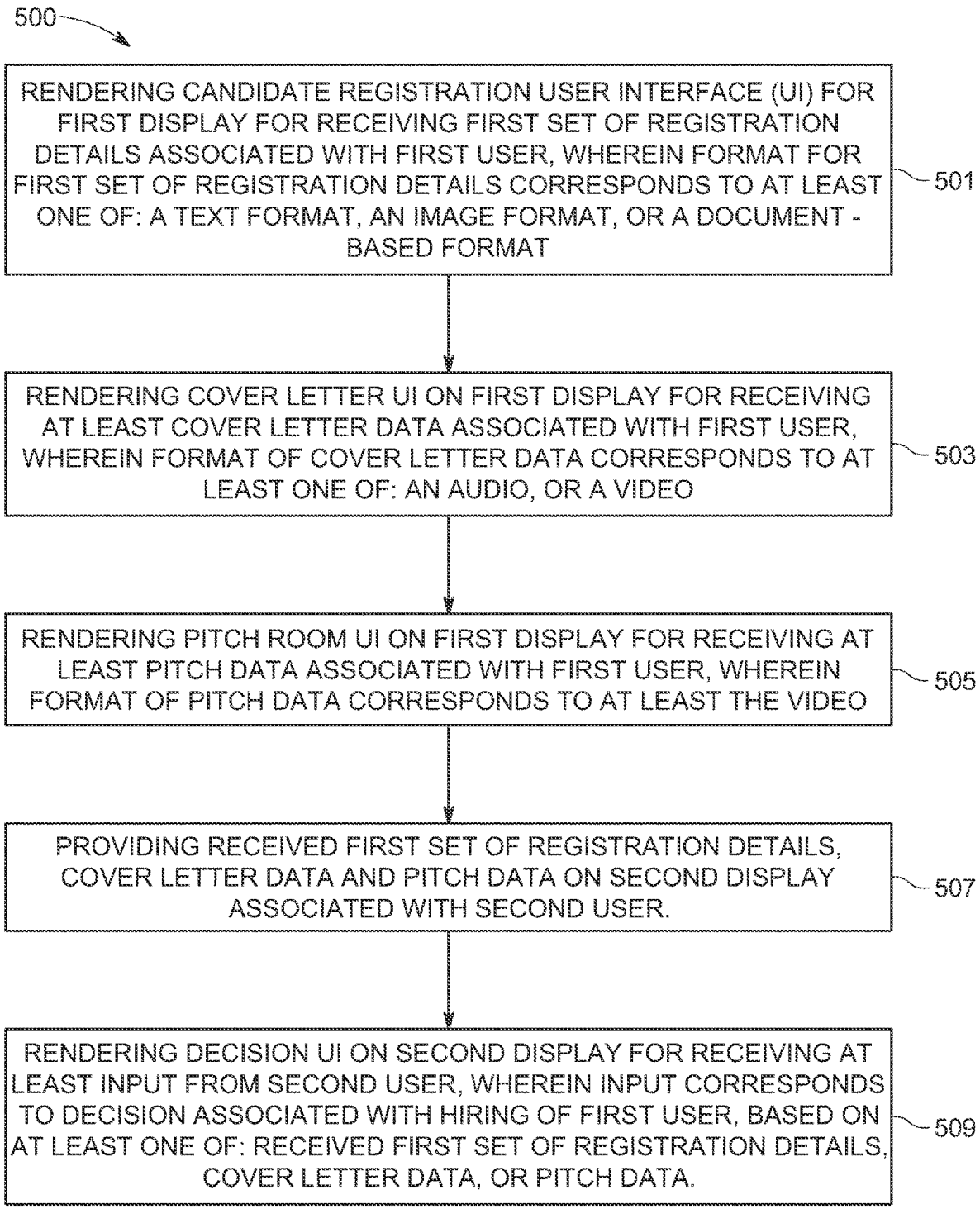

Having thus described example embodiments of the invention in general terms, reference will now be made to the accompanying drawings, which are not necessarily drawn to scale, and wherein:

FIG. 1 illustrates a network environment of a system for hiring users, in accordance with an example embodiment;

FIG. 2 illustrates a block diagram of a system for hiring the users, in accordance with an example embodiment;

FIG. 3A, FIG. 3B and FIG. 3C collectively illustrates a sequence diagram depicting steps for hiring the users, in accordance with an example embodiment;

FIG. 4A illustrates an exemplary diagram depicting a candidate registration user interface (UI), in accordance with an example embodiment;

FIG. 4B illustrates an exemplary diagram depicting a cover letter UI, in accordance with an example embodiment;

FIG. 4C illustrates an exemplary diagram depicting a pitch room UI, in accordance with an example embodiment;

FIG. 4D illustrates an exemplary diagram depicting a decision UI, in accordance with an example embodiment; and FIG. 5 illustrates a flow diagram of a method for hiring the users, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Embodiments of the present disclosure may provide a system, a method, and a computer program product for hiring users.

Generally, conventional hiring systems may rely on short-listing resumes of a number of candidates and scheduling a plurality of interview rounds with the candidates having their resumes shortlisted. In many instances, the resumes may miss some relevant information about the candidates. In such a case, the organization may miss the suitable candidate in first place. Further, the setting up and going through the plurality of interview rounds (such as in form of a digital setup or an in-person setup) may be a tedious and a lengthy process for both the candidate and the organization. On the other hand, the system of the present disclosure may provide a hiring platform that may be utilized by the candidates as well as by recruiters of the organizations to effectively hire or connect with the users, such as the candidates. The system renders a plurality of user interfaces to receive registration details, an audio that includes cover letter data a video that includes pitch data by the candidate. In such a manner, relevant details may be provided by the candidates that may be viewed by the recruiters to make a decision regarding the hiring of the candidates. The cover letter data may be recorded by the candidate on the hiring platform itself that may briefly indicate details, such as interests and fitness of the candidate for a required job profile. Moreover, the pitch data may be utilized by the candidate to pitch itself to the recruiter. In an embodiment, the video that includes the pitch data may be recorded and viewed in an artificial reality (for example, virtual reality (VR)) environment. The system may further receive a video that caters to industry relevant questions answered by the candidate. Thus, the system may enable analysis of the skillset of the candidates by viewing the registration details, the audio that includes the cover letter data the video that includes the pitch data, to select the suitable candidate. The system may further enable elimination of the plurality of interview rounds that may lead to saving of the resources by the organization, and thus, the system may enable a cost effective, brief and a non-tedious hiring process.

The system, the method, and the computer program product facilitating the hiring of the users, such as the candidates in an improved manner are described with reference to FIG. 1, FIG. 2, FIG. 3A, FIG. 3B, FIG. 3C, FIG. 4A, FIG. 4B, FIG. 4C, FIG. 4D and FIG. 5 as detailed below.

FIG. 1 illustrates a network environment 100 of a system 101 for hiring users, in accordance with an example embodiment. The network environment 100 may include a first device 103 associated with a first user 105 and a second device 107 associated with a second user 109. The system 101, the first device 103 and the second device 107 may be communicatively coupled via a communication network 111.

The first device 103 may include a first display 113. The first display 113 may display a hiring platform 115 provided by the system 101. The hiring platform 115 may include a candidate registration user interface (UI) 117. The candidate registration UI 117 may include a first set of registration details 117A. The hiring platform 115 may further include a cover letter UI 119. The cover letter UI 119 may include cover letter data 119A. The hiring platform 115 may further include a pitch room UI 121. The pitch room UI 121 may include pitch data 121A.

Moreover, the second device 107 may include a second display 123. The second display 123 may display the hiring platform 115 provided by the system 101. The hiring platform 115 may include a client registration UI 125. The client registration UI 125 may include a second set of registration details 125A. The hiring platform 115 may further include a decision UI 127. The decision UI 127 may include an input 127A.

The system 101 be configured to perform one or more operations, such as generation of the hiring platform 115. The system 101 may further render a plurality of UIs, such as the candidate registration UI 117, the cover letter UI 119, the pitch room UI 121, the client registration UI 125 and the decision UI 127 on respective display, such as the first display 103 and the second display 107.

In an example embodiment, the system 101 may be embodied in one or more of several ways as per the required implementation. For example, the system 101 may be embodied as a cloud-based service or a cloud-based platform. In each of such embodiments, the system 101 may be communicatively coupled to the components shown in FIG. 1 to carry out the desired operations and wherever required modifications may be possible within the scope of the present disclosure. The system 101 may be implemented in a device, such as the first device 105 and the second device 107. Further, in one embodiment, the system 101 may be a standalone unit configured to generate or provide the hiring platform 115 to render the plurality of UIs. Alternatively, the system 101 may be coupled externally with the device 105 and the second device 107. In some example embodiments, the system 101 may be any user accessible device such as a mobile phone, a smartphone, a portable computer, and the like that are portable in themselves or as a part of another portable/mobile object. The system 101 may comprise a processor, a memory, and a communication interface. The processor, the memory and the communication interface may be communicatively coupled to each other. In some example embodiments, the system 101 may comprise a processing means such as a central processing unit (CPU), storage means such as read only memory (ROM) and random-access memory (RAM), a display enabled user interface such as a touch screen display, and other components as may be required for specific functionalities of system 101. Additional, different, or fewer components may be provided. For example, the system 101 may be configured to execute and run mobile applications such as a messaging application, a browser application, a hiring application, and the like. In some example embodiments, the system 101 may serve the dual purpose of a data gatherer and a beneficiary device.

A device, such as the first device 105 and the second device 107 may be configured to provide access to the plurality of UIs to the respective users. In some embodiments, the first user 105 may be a candidate for a job, an applicant for the job, a user such as an artist, a professional requiring to connect with suitable clients and the like. The first device 105 may provide access to the candidate registration UI 117, the cover letter UI 119 and the pitch room UI to the first user 105. The second user 109 may be a recruiter or a client requiring connecting with the candidates, the applicants and the professionals such as the first user 105.

The second device 107 may provide access to the client registration UI 125 and the decision UI 127 to the second user 109.

In some example embodiments, the first device 105 and the second device 107 may be any user accessible device such as a mobile phone, a smartphone, a portable computer, and the like, as a part of another portable/mobile object. The first device 105 and the second device 107 may comprise a processor, a memory, and a communication interface. The processor, the memory and the communication interface may be communicatively coupled to each other. In some example embodiments, the first device 105 and the second device 107 may be associated, coupled, or otherwise integrated with the system 101, a portable navigation device, an infotainment system and/or other device that may be configured to provide the hiring platform 115 to the users. In such example embodiments, the first device 105 and the second device 107 may comprise processing means such as the CPU, storage means, such as the ROM and the RAM, a display that enables rendering of a user interface such as the first display 113 and the second display 123, and other components as may be required for specific functionalities of the UE 107. For example, the first display 113 and the second display 123 may be touch screen display. Examples of the first display 113 and the second display 123 may include, but may not be limited to, different types of light emitting diode (LED) display, a cathode ray tube (CRT) display, different types of liquid crystal display (LCD) and plasma display. In some embodiments, the first display 113 and the second display 123 may be communicatively coupled to the first device 1103 and the second device 107 respectively via the communication network 111. Additional, different, or fewer components may be provided. In one embodiment, the first device 1103 and the second device 107 may be directly coupled to the system 101 via the communication network 111. In some example embodiments, the first device 1103 and the second device 107 may be coupled to the system 101 via the communication network 111. For example, the first device 1103 and the second device 107 may be a consumer device (or a part thereof) and may be a beneficiary of the services provided by the system 101.

The hiring platform 115 may be generated by the system 101. In an embodiment, the system 101 may utilize an artificial intelligence (AI) model to generate the hiring platform 115. In some embodiments, the hiring platform 115 may be provided by the system 101 on the first device 103 and the second device 107. For example, the hiring platform 115 may be a software application that may be downloaded by the first user 105 on the first device 103 and the second user 109 on the second device 107. In an exemplary scenario, the hiring platform 115 may be utilized by the first user 105 to connect with the recruiter (such as the second user 109) to obtain a suitable job, whereas the hiring platform 115 may be utilized by the second user 109 to hire users for the jobs. In another example, the hiring platform 115 may be utilized by the users, such as musicians, artists, business owners, entrepreneurs and the like to connect or collaborate with other users in the same industry.

The candidate registration UI 117 may be rendered by the system 101 on the first display 113 to receive the first set of registration details 117A. The candidate registration UI 117 may include a plurality of UI elements to enable reception of the first set of registration details 117A. The first set of registration details 117A may include for example, personal information (such as name and date of birth), educational qualification, work experience and the like of the first user 105. Details of the candidate registration UI 117 and the first set of registration details 117A are further provided, for example, in FIG. 3A and FIG. 4A.

The cover letter UI 119 may be rendered by the system 101 on the first display 113 to receive the cover letter data 119A. The cover letter UI 119 may include a plurality of UI elements to enable reception of the cover letter data 119A. The cover letter data 119A may be in an audio format that may include for example, details from the first user 105 corresponding to a relevant expertise of the first user 105 for the required job. Details of the cover letter UI 119 and the cover letter data 119A are further provided, for example, in FIG. 3A and FIG. 4B.

The pitch room UI 121 may be rendered by the system 101 on the first display 113 to receive the pitch data 121A. The pitch room UI 121 may include a plurality of UI elements to enable reception of the pitch data 121A. The pitch data 121A may be in a video format that may include for example, a pitch by the first user 105 that describes the fitness of the first user 105 for the required job. Details of the pitch room UI 121 and the pitch data 121A are further provided, for example, in FIG. 3A and FIG. 4C.

The client registration UI 125 may be rendered by the system 101 on the second display 123 to receive the second set of registration details 125A. The client registration UI 125 may include a plurality of UI elements to enable reception of the second set of registration details 125A. The second set of registration details 125A may include for example, information such as organization owner, type of industry, establishment year of the organization associated with the second user 109. Details of the client registration UI 125 and the second set of registration details 125A are further provided, for example, in FIG. 3A.

The decision UI 127 may be rendered by the system 101 on the second display 123 to receive the input 127A. The decision UI 127 may include a plurality of UI elements to enable reception of the input 127A. The input 127A may correspond to the decision associated with the hiring of the first user 105. Details of the decision UI 127 and the input 127A are further provided, for example, in FIG. 3B and FIG. 4D.

The communication network 111 may be wired, wireless, or any combination of wired and wireless communication networks, such as cellular, Wi-Fi, internet, local area networks, or the like. In one embodiment, the communication network 111 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, International Telecommunications Union—International Mobile Telecommunications (ITU-IMT) 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. The system 101 may be configured to communicate with the first device 103 and the second device 107 over the communication network 111.

In operation, a job may be required by the first user 105. In such a scenario, the hiring platform 115 may be downloaded by the first user 105 on the first device 103. The system 101 may provide the hiring platform 115 on the first device 103. The system 101 may further render the candidate registration user interface UI 117 to receive the first set of registration details 117A. In an embodiment, the first set of registration details 117A may also include registration details, such as a contact number and an electronic mail address of the first user 105. Details of the reception of the first set of registration details 117A are further provided, for example, in FIG. 3A.

Upon reception of the first set of registration details 117A, the system 101 may render the cover letter UI 119. By using the cover letter UI 119, the cover letter data 119A may be uploaded by the first user 105 on the hiring platform 115. The cover letter data 119A may be for example, in the audio format. Details of the reception of the cover letter data 119A are further provided, for example, in FIG. 3A.

Once the cover letter data 119A is received, the system 101 may render the pitch room UI 121 to receive the pitch data 121A from the first user 105. The pitch data 121A may be utilized by the first user 105 to pitch himself to a desired recruiter. For example, the pitch data 121A may be in the video format. In an embodiment, the pitch data 121A may be uploaded in a virtual reality (VR) environment. In such a manner the desired information may be uploaded by the first user 105 on the hiring platform 115. Details of the reception of the pitch data 121A are further provided, for example, in FIG. 3B.

Moreover, the hiring platform 115 may be utilized by the second user 109 for hiring of the users, such as the first user 105. In order to utilize the hiring platform 115, registration of the second user 109 or the organization associated with the second user 109 may be required on the hiring platform 115. The system 101 may render the client registration UI 125 on the second display 123 to receive the second set of registration details 125A associated with the second user 109 or the organization associated with the second user 109. For example, the second set of registration details 125A may include job description and skillset of the desired candidate required by the organization. Details of the reception of the second set of registration details 125A are further provided, for example, in FIG. 3A.

After reception of the second set of registration details 125A, the system 101 may provide data of the desired candidates to the second user 109. In an embodiment, the system 101 may provide recommendations of the desired candidates to the second user 109. The system 101 may allow the second user 109 to view profile of the desired candidates, such as the first user 105 registered on the hiring platform 115. In an example, the system 101 may provide access of the first set of registration details 117A, the cover letter data 119A and the pitch data 121A of the first user 105 to the second user 109. Details of providing the first set of registration details 117A, the cover letter data 119A and the pitch data 121A are further provided, for example, in FIG. 3B.

The first set of registration details 117A, the cover letter data 119A and the pitch data 121A may be viewed by the second user 109. The system 101 may further render the decision UI 127 on the second device 107. The decision UI 127 may be utilized by the second user 109 to decide regarding hiring of the first user 105. The input 127A that corresponds to the decision may be received from the second user 109 in the decision UI 127. For example, the input 127A may correspond to selection of the first user 105, rejection of the first user 105 or decision of the selection or the rejection of the first user 105 on hold by the second user 109. Details of the reception of the input 127A may further be provided, for example, in FIG. 3B.

Based on a determination that the input 127A corresponds to selection of the first user 105, and the selection has been accepted by the first user 105, the system 101 may further provide an onboarding UI element on the second display 123 for the second user 109, to initiate the onboarding of the first user 105 in the organization. Furthermore, the system 101 may render a document upload UI on the first display 113 to receive relevant documents from the first user 105 for the hiring purposes. Thus, the system 101 may simplify the hiring process for both the first user 105 and the second user 109. Details of the onboarding UI element and the document upload UI are further provided, for example, in FIG. 3C.

FIG. 2 illustrates a block diagram 200 of the system 101 for hiring the users, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205").

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

The processor 201 may further include one or more processing modules, such as a candidate registration UI render module 201A, a client registration UI render module 201B, a cover letter UI render module 201C, a pitch room UI render module 201D, a data providing module 201E and a decision UI render module 201F.

The candidate registration UI render module 201A may be configured to render the candidate registration UI 117 to receive the first set of registration details 117A. The rendered candidate registration UI 117 may include the plurality of UI elements to enable reception of the first set of registration details 117A by the first user 105.

The client registration UI render module 201B may be configured to render the client registration UI 125 to receive the second set of registration details 125A. The rendered client registration UI 125 may include the plurality of UI elements to enable reception of the second set of registration details 125A by the second user 109.

The cover letter UI render module 201C may be configured to render the cover letter UI 119 to receive the cover letter data 119A. The rendered cover letter UI 119 may include UI elements, such as a playback UI element to modify the cover letter data 119A uploaded by the first user 105.

The pitch room UI render module 201D may be configured to render the pitch room UI 121 to receive the pitch data 121A. The rendered pitch room UI 121 may include the plurality of UI elements to enable reception of the pitch data 121A in the video format. In some embodiments, the pitch room UI render module 201D may further render the pitch room UI 121 in the VR environment.

The data providing module 201E may be configured to provide the first set of registration details 117A, the cover letter data 119A and the pitch data 121A to the second user 109 via the second device 107. The first set of registration details 117A, the cover letter data 119A and the pitch data 121A may be utilized by the second user 109 to make the decision regarding the hiring of the first user 105.

The decision UI render module 201F may be configured to render the decision UI 127 on the second display 123 to receive the input 127A from the second user 109. The input 127A may correspond to the decision associated with the hiring of the first user 105. The rendered decision UI 127 may include the plurality of UI elements to enable reception of the input 127A.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present disclosure. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present disclosure while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present disclosure by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the system 101 or any other component with which the system 101 may communicate. The communication interface 205 may be any means such as a device or circuitry embodied in either hardware or a combination of hardware and software that is configured to receive and/or transmit data to/from a communications device in communication with the system 101. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms. In some embodiments, the communication interface 205 may enable communication with a cloud-based network to enable deep learning.

FIG. 3A, FIG. 3B and FIG. 3C collectively illustrates a sequence diagram 300 depicting steps for hiring the users, in accordance with an example embodiment. The sequence diagram 300 may include steps 301, 303, 305, 307, 309, 311, 313, 315, 317, 319, 321, 323, 325, 327, 329, 331, 333, 335, 337, 339, 341, 343, 345, 347, 349, 351 and 353. The steps of the sequence diagram 300 may be performed by the system 101 or any circuitry, such as the processor 201, the first device 103 and the second device 107.

At step 301, the processor 201 may be configured to render the candidate registration UI 117 on the first display 113 of the first device 103. The candidate registration UI 117 may be utilized by the first user 105 to upload the first set of registration details 117A on the hiring platform 115. In some embodiments, the processor 201 may provide a tutorial video on the rendered candidate registration UI 117 to assist the first user 105 in completion of an application of the first user 105 on the hiring platform 115.

The first set of registration details 117A may include, for example, a name of the first user 105, a date of birth of the first user 105, a residential address of the first user 105, a nationality of the first user 105, a work experience of the first user 105, an educational qualification of the first user 105, a skillset of the first user 105, certifications obtained by the first user 105, a photograph of the first user 105, a profile template and the like. The processor 201 may receive the first set of registration details 117A via the rendered candidate registration UI 117.

Alternatively, at step 303, after rendering the candidate registration UI 117, the processor 201 may be configured to receive an information document associated with the first user 105 via a first UI element of the candidate registration UI 117. The processor 201 may receive the information document via the first device 103. Examples of the information document may include, but may not be limited to, a resume, a curriculum vitae (CV), or a biodata of the first user 105. The format of the first set of registration details 117A may correspond to at least one of a text format, an image format, or a document-based format. For example, the first set of registration details 117A may be entered by the first user 105 in form of the text. Moreover, the information document that includes the first set of registration details 117A may be uploaded as the image or the document such as a portable document format (PDF) by the first user 105.

At step 305, after reception of the information document, the processor 201 may retrieve the first set of registration details 117A associated with the first user 105 from the received information document. In an exemplary scenario, the resume may be uploaded by the first user 105 as the information document via the candidate registration UI 117. The processor 201 may retrieve the first set of registration details 117A, such as the name of the first user 105, the date of birth of the first user 105, the residential address of the first user 105, the nationality of the first user 105, the work experience of the first user 105, the educational qualification of the first user 105, the skillset of the first user 105, and the certifications obtained by the first user 105, from the uploaded resume. Thus, the system 101 may enable automatic retrieval of the first set of registration details 117A from the information document.

At step 307, the processor 201 may be further configured to receive an input corresponding to acceptance, rejection or modification of the retrieved first set of registration details 117A via a second UI element of the candidate registration UI 117. For example, the second UI element may be utilized by the first user 105 to modify any details of the first set of registration details 117A. In an exemplary embodiment, the uploaded information document may not be up to date. In such a case, few details, such as the work experience included in retrieved the first set of registration details 117A may be modified by the first user 105 by using the second UI element.

In some embodiments, the rendered candidate registration UI 117 may further include a third UI element corresponding to the cover letter UI 119 and a fourth UI element corresponding to the pitch room UI 121. The third UI element and the fourth UI element may be utilized by the first user 105 to visit the respective UIs. The third UI element and the fourth UI element may further be utilized by the first user 105 to upload the cover letter data 119A and the pitch data 121A respectively. Exemplary candidate registration UI 117 including the first UI element, the second UI element, the third UI element and the fourth UI element, is further shown in FIG. 4A.

After reception of the first set of registration details 117A, at step 309, the processor 201 may be further configured to render the cover letter UI 119 on the first display 113 of the first device 103. The cover letter UI 119 may be rendered to receive at least cover letter data 119A associated with the first user 105. The cover letter UI 119 may include the plurality of UI elements to receive the cover letter data 119A from the first user 105.

At step 311, the processor 201 may be configured to receive the cover letter data 119A from the first device 103. The format of the cover letter data 119A may correspond to at least one of the audio, or the video. The cover letter data 119A may be for example, an audio file uploaded by the first user 105. The cover letter data 119A may serve as a cover letter that includes information required by human resources department of the organization. Such information may further encourage the second user 109 of the organization to know more about the first user 105. In an embodiment, the cover letter data 119A may be prepared or recorded in an application different than the hiring platform 115 and uploaded as the audio file by the first user 105. In another embodiment, the cover letter data 119A may be recorded in the cover letter UI 119 of the hiring platform 115 itself. For example, the cover letter UI 119 may include an audio upload UI element that may enable recording of the cover letter data 119A by the first user 105.

In some embodiments, the rendered cover letter UI 119 may further include one or more details of the received first set of registration details 119A associated with the first user 105. The format of one or more details is the text format. For example, the processor 201 may retrieve one or more details from the uploaded cover letter data 119A. The retrieved one or more details may be displayed in the cover letter UI 119. Thus, in such a manner, one or more details may be referred by the second user 109 while making the decision regarding the first user 105.

At step 313, the processor 201 may be further configured to display the uploaded or recorded cover letter data 119A to the first user 105 via the cover letter UI 119. After viewing or listening to the displayed cover letter data 119A, the cover letter data 119A may be reviewed by the first user 105.

In some embodiments, the rendered cover letter UI 119 further includes a playback UI element. At step 315, the processor 201 may be further configured to receive an input, via the playback UI element to modify the received cover letter data 119A associated with the first user 105. In an exemplary scenario, the recorded cover letter data 119A may need to be modified by the first user 105. In such a case, the playback UI element may be utilized to edit or modify one or more parts of the recorded cover letter data 119A. In such a manner, the processor 201 enables modification of one or more parts of the recorded cover letter data 119A, without a need of recording the entire cover letter data 119A by the first user 105. Exemplary cover letter UI 119 including the audio upload UI element and the playback UI element is further shown in FIG. 4B.

After receiving the cover letter data 119A, at step 317, the processor 201 may be further configured to render the pitch room UI 121 on the first display 113 of the first device 103. The pitch room UI 121 may be rendered to receive the pitch data 121A from the first user 105. The format of the pitch data 121A may correspond to at least the video. In some embodiments, the processor 201 may be configured to render the pitch room UI 121 as the VR environment. In such a case, the first device 103 may be a VR device that may be capable of displaying the pitch room UI 121 as the VR environment. For example, the first device 103 may be a VR headset or VR glasses.

After rendering the pitch room UI 121, at step 319, the processor 201 may be further configured to render a fifth UI element corresponding to suggestions for uploading the pitch data 121A associated with the first user 105. For example, the processor 201 may transmit the suggestions based on rendering of the fifth UI element. The suggestions for uploading the pitch data 121A may include suggestion notes for the first user 105 to view before starting to record the pitch data 121A. For example, the suggestions may be in a form of a presentation that may include list of things that may be followed while recording the pitch data 121A. The suggestions may be utilized by the first user 105 to correctly record the pitch data 121A. Exemplary pitch room UI 121 that includes the fifth UI element is further shown in FIG. 4C.

After rendering the pitch room UI 121 and providing suggestions for uploading the pitch data 121A, at step 321, the processor 201 may be further configured to receive the pitch data 121A from the first device 103. The pitch data 121A may be the video that may provide the first user 105 a freedom of an uninhibited workspace to convey vital information that may aid in making offer to the recruiters, such as the second user 109. The processor 201 may enable usage of visual aids such as portfolios and props tat may be utilized by the first user 105 to record the pitch data 121A.

In some embodiments, the processor 201 may receive the pitch data 121A that includes at least a VR object associated with the first user 105 in the rendered pitch room UI 121, in case the pitch room UI 121 is rendered in the VR environment. In such a case, the pitch room UI 121 may be modified by the processor 201 by use of the AI model. For example, the pitch room UI 121 may be a simulated environment or may include a hologram of the first user 105 as the VR object. The processor 201 may further reconfigure the pitch room UI 121 to fit a VR interview like a virtual in-person space if needed for the hiring process.

At step 323, the processor 201 may display the recorded pitch data 121A on the first device 103. The displayed pitch data 121A may be reviewed by the first user 105 before finalizing.

At step 325, the processor 201 may be further configured to receive industry relevant data associated with the first user 105 via the rendered pitch room UI 121. The format of the industry relevant data corresponds to at least the video. The industry relevant data may include answers to questions that the organization may require to know, such human resources questions, or technical industry related questions. Thus, the processor 201 may receive the first set of registration details 117A, the cover letter data 119A, the pitch data 121A and the industry relevant data from the first user 105. The processor 201 may, at step 327, display the industry relevant data on the first display 113 of the first device 103. The displayed industry relevant data may be reviewed and modified by the first user 105. In an embodiment, the complete application of the first user 105 including the first set of registration details 117A, the cover letter data 119A and the pitch data 121A may be downloaded by the first user 105 on the first device 103.

Similar to the registration of the first user 105 on the hiring platform 115, the processor 201 may enable registration of the second user 109 or the organization associated with the second user 109 on the hiring platform 115. It may be noted that the sequence of the registration of the first user 105 and the second user 109 may be reversed. In such a case, the processor 201 may enable registration of the second user 109 before the registration of the first user 105. Thus, steps 329 and 331 may be performed before the steps 301, 303, 305 and 307.

At step 329, the processor 201 may be configured to render the client registration UI 125 on the second display 123 of the second device 107. The client registration UI 125 may be utilized by the second user 109 to upload the second set of registration details 125A on the hiring platform 115.

Once the client registration UI 125 is rendered, at step 331, the processor 201 may be configured to receive the second set of registration details 125A from the second device 107. In an embodiment, the second set of registration details 125A may be entered by the second user 109 in the text format. In another embodiment, the second set of registration details 125A may be uploaded as the image or the document (such as PDF) and the processor 201 may retrieve the second set of registration details 125A from the uploaded image or the document.

The second set of registration details 125A may include information regarding the organization that requires to recruit the suitable candidates. For example, the second set of registration details 125A may include a name of the organization, a date of establishment of the organization, an address of the organization, a country of origin of the organization, a type of the organization, roles for which recruitment is needed, and the like.

In an embodiment, the client registration UI 125 may include one or more forms that may be utilized to fill the second set of registration details 125A by the second user 109. These one or more forms may include details such as hiring needs of the organization, package selection for the candidates, and the like.

In some embodiments, the processor 201 may enable communication between one or more executives associated with the hiring platform 115 and the second user 109. These one or more executives may help the second user 109 to select one or more industries that the organization may be seeking recruitment for. After receiving the second set of registration details 125A and selection of the industries by the second user 109, the processor 201 may enable searching of suitable candidates that may include the first suer 105 in a database of the hiring platform 115. The database may include profiles of all the registered candidates that may need to be a part of the hiring process. In an embodiment, the processor 201 may provide suggestions of the suitable candidates to the second user 109.

After registration by the second user 109, at step 333, the processor 201 may be further configured to provide or transmit the received first set of registration details 117A, the cover letter data 119A and the pitch data 121A on the second display 123 of the second device 107 associated with the second user 109. In an embodiment, the processor 201 may provide access of the candidate registration UI 117, the cover letter UI 119 and the pitch room UI 121 to the second user 109 to review the corresponding details provided by the first user 105. For example, the candidate registration UI 117 may be provided on the second display 123. The candidate registration UI 117 may include the third UI element corresponding to the cover letter UI 119 and the fourth UI element corresponding to the pitch room UI 121. The cover letter UI 119 and the pitch room UI 121 may be visited by the second user 109 via the third UI element and the fourth UI element.

In some embodiments, once the pitch data 121A is viewed, at step 335, the processor 201 may be further configured to generate a notification based on a determination that the pitch data 121A associated with the first user 105 is accessed by the second user 109. The processor 201 may provide the generated notification on the first display 113 of the first device 103. Thus, the processor 201 may enable the candidates, such as the first user 105 to know when their profiles are being viewed by the recruiters on the hiring platform 115.

After providing access to the profile of first user 105, at step 337, the processor 201 may be further configured to render the decision UI 127 on the second display 123 of the second device 107. The decision UI 127 may be rendered to receive the input 127A.

At step 339, the processor 201 may be further configured to receive the input 127A from the second device 107. The input 127A corresponds to the decision associated with the hiring of the first user 105, provided by the second user 109 based on at least one of the received first set of registration details 117A, the cover letter data 119A, or the pitch data 121A. For example, the decision associated with the hiring of the first user 105 may be selection of the first user 105, rejection of the first user 105 or decision of the selection or the rejection of the first user 105 on hold by the second user 109. In other words, the decision may be to make a hard offer, a contingent offer or no offer. The contingent offer may include selection based on one or more criteria, such as background check, drug screening, tests, training materials, a final interview and the like. The input 127A may be provided by the second user 109 via a decision UI element rendered in the decision UI 127. Exemplary decision UI 127 that includes the decision UI element is further shown in FIG. 4D.

In some embodiments, after receiving the input 127A, at step 341, the processor 201 may be further configured to generate a notice of decision based on the input 127A received from the second user 109 on the rendered decision UI 127. The notice of decision corresponds to at least one of the selections of the first user 105, rejection of the first user 105 or decision of the selection or the rejection of the first user 105 on hold by the second user 109. The notice of decision may be generated to inform the first user 105 about the decision of the hiring of the first user 105 by the second user 109. For example, the second user 109 may decide that the first user 105 may be the suitable candidate. In such a case, the notice of decision may indicate that the first user 105 has been selected for the role in the organization. In another example, the second user 109 may decide that the first user 105 may be the unsuitable candidate. In such a case, the notice of decision may indicate that the first user 105 has not been selected for the role in the organization.

At step 343, the processor 201 may be further configured to provide the generated notice of decision to the first device 103. The notice of decision may be viewed by the first user 105 on the hiring platform 115. In case the notice of decision indicates that the first user 105 has not been selected for the role in the organization, the hiring process may stop for the first user 105. The second user 109 may further screen the profiles of the other registered candidates on the hiring platform 115 for the hiring process.

In case the notice of decision indicates that the first user 105 has been selected for the role in the organization, the first user 105 may decide to accept an offer of selection made by the second user 109 or reject the offer of selection made by the second user 109. Such a step would enable saving up of the resources and display professional courts of the organization to the first user 105.

In case the first user 105 decides to accept the offer of selection, at step 345, the processor 201 may be further configured to receive the acceptance of the offer of selection by the first user 105 from the first device 103. The received acceptance of the offer of selection may further be provided on the second device 107 for the second user 109.

After receiving the acceptance of the offer of selection by the first user 105, at step 347, the processor 201 may be further configured to provide an onboarding UI element on the second display 123 of the second device 107, to initiate a process of onboarding of the first user 105, based on a determination that the generated notice of decision that corresponds to the selection of the first user 105 is accepted by the first user 105. The onboarding UI element may be selected by the second user 109 to receive necessary documents and information of the first user 105 to successfully initiate the onboarding process of the first user 105. It may be noted that the processor 201 may receive a permission from the first user 105 to share information, such as the drug screening and the background check with the second user 109.

In case some additional one or more documents are required by the second user 109, at step 349, the processor 201 may be further configured to render a document upload UI on the first display 113 of the first device 103 to receive at least one or more documents associated with the first user 105. One or more documents may be received based on the determination that the generated notice of decision corresponds to at least one of the selections of the first user 105 or the decision of the selection or the rejection of the first user 105 is on hold.

At step 351, the processor 201 may be further configured to receive the additional one or more documents from the first device 103. The processor 201 may, at step 353, provide the additional one or more documents received from the first user 105 to the second device 107. The additional one or more documents may be utilized by the second user 109 for completing hiring of the first user 105.

The system 101 of the present disclosure may further be utilized in various industries, such as the entertainment industry to review casts for movies or shows, or finding new musicians or dancers. Further, the system 101 may be utilized for small or large businesses to find potential business partners or sources of funding serving as a business to a business agent.

FIG. 4A illustrates an exemplary diagram 400A depicting the candidate registration UI 117, in accordance with an example embodiment. The exemplary diagram 400A may include the first device 103. The first device 103 shows the first display 113. The hiring platform 115 is rendered on the first display 113. The hiring platform 115 includes the candidate registration UI 117.

The candidate registration UI 117 may include a menu UI element 401. The menu UI element 401 may be utilized by the first user 105 to view account details, such as profile photograph and the like. The candidate registration UI 117 may further display the first set of registration details 117A such as the name and the experience of the first user 105. The candidate registration UI 117 may further include a first UI element 403 to receive the information document. The candidate registration UI 117 may further include a second UI element 405 to receive the input corresponding to acceptance, rejection or modification of the retrieved first set of registration details 117A. For example, the second UI element 405 may include an accept element 405A to accept the first set of registration details 117A, an edit element 405B to modify the first set of registration details 117A and a close element 405C to reject the first set of registration details 117A.

Furthermore, the candidate registration UI 117 may include a third UI element 407 that corresponds to the cover letter UI 119. The third UI element 407 may be utilized by the first user 105 to visit the cover letter UI 119. The candidate registration UI 117 may include a fourth UI element 409 that corresponds to the pitch room UI 121. The fourth UI element 409 may be utilized by the first user 105 to visit the pitch room UI 121.

FIG. 4B illustrates an exemplary diagram 400B depicting the cover letter UI 119, in accordance with an example embodiment. The exemplary diagram 400B may include the first device 103. The first device 103 shows the first display 113. The hiring platform 115 is rendered on the first display 113. The hiring platform 115 includes the cover letter UI 119.

The cover letter UI 119 may include the menu UI element 401. The cover letter UI 119 may further include an audio upload UI element 411. The audio upload UI element 411 may be utilized to record the cover letter data 119A. The cover letter UI 119 may further include a playback UI element 413 that may be utilized to modify the received cover letter data 119A. The cover letter UI 119 may further include a UI element 415 to view one or more details displayed in the cover letter UI 119. Moreover, the cover letter UI 119 may include a UI element 417 to view the candidate registration UI 117.

FIG. 4C illustrates an exemplary diagram 400C depicting the pitch room UI 121, in accordance with an example embodiment. The exemplary diagram 400C may include the first device 103. The first device 103 shows the first display 113. The hiring platform 115 is rendered on the first display 113. The hiring platform 115 includes the pitch room UI 121.

The pitch room UI 121 may display the pitch data 121A as a video 419. For example, the video 419 may be rendered in the VR environment. The pitch room UI 121 may include a UI element 421 to view, pause or stop the video 419. The pitch room UI 121 may further include a fifth UI element 423 that corresponds to the suggestions for uploading the pitch data 121A associated with the first user 105.

FIG. 4D illustrates an exemplary diagram 400D depicting the decision UI 127, in accordance with an example embodiment. The exemplary diagram 400C may include the second device 105. The second device 105 shows the second display 123. The hiring platform 115 is rendered on the second display 123. The hiring platform 115 includes the decision UI 127.

The decision UI 127 may include the menu UI element 401 to view the profile details of the organization of the second user 109. The decision UI 127 may further include the UI element 417 to view the candidate registration UI 117, the third UI element 407 and the fourth UI element 409. The decision UI 127 may further include a decision UI element 425 that may be utilized by the second user 109 to provide the input 127A that corresponds to the decision associated with the hiring of the first user 105.

FIG. 5 illustrates a flow diagram of a method 500 for hiring the users, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present disclosure and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is used for the hiring of the users. Fewer, more, or different steps may be provided.

At step 501, the method 500 comprises rendering the candidate registration UI 117 for the first display 113 for receiving the first set of registration details 117A associated with the first user 105. The format for the first set of registration details 117A corresponds to at least one of the text format, the image format, or the document-based format. Details of the rendering of the candidate registration UI 117 are further provided, for example, in FIG. 3A.

At step 503, the method 500 comprises rendering the cover letter UI 119 on the first display 113 for receiving at least the cover letter data 119A associated with the first user 105. The format of the cover letter data 119A corresponds to at least one of the audio, or the video. Details of the rendering of the cover letter data 119A are further provided, for example, in FIG. 3A.

At a step 505, the method 500 comprises rendering the pitch room UI 121 for the first display 113 for receiving at least the pitch data 121A associated with the first user 105. The format of the pitch data 121A corresponds to at least the video. Details of the rendering of the pitch room UI 121 are further provided, for example, in FIG. 3A.

At a step 507, the method 500 comprises providing the received first set of registration details 117A, the cover letter data 119A and the pitch data 121A on the second display 123 associated with the second user 109. Details of the providing of the received first set of registration details 117A, the cover letter data 119A and the pitch data 121A are further provided, for example, in FIG. 3B.

At a step 509, the method 500 comprises rendering the decision UI 127 on the second display 123 for receiving at least the input 127A from the second user 109. The input 127A corresponds to the decision associated with the hiring of the first user 105, based on at least one of the received first set of registration details 117A, the cover letter data 119A, or the pitch data 121A. Details of the rendering of the decision UI 127 are further provided, for example, in FIG. 3B.

The method 500 may be implemented using corresponding circuitry. For example, the method 500 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g. the processor 201) configured to perform some or each of the operations of the method of FIG. 5 described previously. The processor may, for example, be configured to perform the operations (501-509) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-509) may comprise, for example, the processor 201 which may be implemented in the system 101 and/or a device or circuit for executing instructions or executing an algorithm for processing information as described above.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for hiring users, the system comprising:
at least one non-transitory memory configured to store computer executable instructions; and
at least one processor configured to execute the computer executable instructions to:
render, on a first display of a first device, a candidate registration user interface (UI), wherein the first device is associated with a first user;
receive, via the candidate registration UI, a first set of registration details associated with the first user, wherein a format of the first set of registration details corresponds to at least one of: a text format, an image format, or a document-based format;
render, on the first display, a cover letter UI, wherein the cover letter UI is different from the candidate registration UI;
receive, via the cover letter UI, at least cover letter data associated with the first user, wherein the format of the cover letter data corresponds to an audio;
render, on the first display, a pitch room UI;
receive, via the pitch room UI, at least pitch data associated with the first user, wherein the format of the pitch data corresponds to at least a video;
provide the received first set of registration details, the cover letter data, and the pitch data to a second device associated with a second user;
render, on a second display of the second device, a decision UI;
receive, via a decision UI element displayed on the decision UI, at least an input from the second user, wherein the input corresponds to a decision associated with the hiring of the first user, based on at least one of: the received first set of registration details, the cover letter data, or the pitch data;
generate a notice of decision based on the input received from the second user on the rendered decision UI; and
provide, on the first display, the generated notice of decision.

2. The system of claim 1, wherein the at least one processor is further configured to:
receive, via a first UI element of the candidate registration UI, an information document associated with the first user;
retrieve the first set of registration details associated with the first user from the received information document; and
receive, via a second UI element of the candidate registration UI, an input corresponding to one of acceptance, rejection or modification of the retrieved first set of registration details.

3. The system of claim 1, wherein the candidate registration UI further comprises:
a third UI element corresponding to the cover letter UI; and
a fourth UI element corresponding to the pitch room UI.

4. The system of claim 1, wherein
the rendered cover letter UI further comprises one or more details of the received first set of registration details associated with the first user, and
the format of one or more details is the text format.

5. The system of claim 1, wherein
the at least one processor is further configured to receive, via the pitch room UI, industry relevant data associated with the first user, and
the format of the industry relevant data corresponds to at least the video.

6. The system of claim 1, wherein
the rendered cover letter UI further comprises a playback UI element, and
the at least one processor is further configured to:
receive an input, via the playback UI element; and
modify the received cover letter data associated with the first user.

7. The system of claim 1, wherein the at least one processor is further configured to:
render the pitch room UI as a virtual reality (VR) environment; and
receive at least pitch data that comprises at least a VR object associated with the first user in the rendered pitch room UI.

8. The system of claim 1, wherein the generated notice of decision corresponds to at least one of: selection of the first user, rejection of the first user or decision of the selection or the rejection of the first user on hold.

9. The system of claim 8, wherein the at least one processor is further configured to:
provide an onboarding UI element on the second display; and
initiate a process of onboarding of the first user, based on a determination that the generated notice of decision that corresponds to the selection of the first user is accepted by the first user.

10. The system of claim 8, wherein the at least one processor is further configured to:
render, on the first display, a document upload UI; and
receive, via the document upload UI, at least one or more documents associated with the first user, based on a determination that the generated notice of decision corresponds to at least one of the selection of the first user or the decision of the selection or the rejection of the first user is on hold.

11. The system of claim 1, wherein the at least one processor is further configured to:
generate a notification based on a determination that at least pitch data associated with the first user is accessed by the second user; and
provide the generated notification on the first display.

12. The system of claim 1, wherein
the at least one processor is further configured to render a fifth UI element on the pitch room UI, and
the fifth UI element corresponds to suggestions for uploading at least pitch data associated with the first user.

13. The system of claim 1, wherein the at least one processor is further configured to:
render a client registration UI on the second display; and
receive, via the client registration UI, a second set of registration details associated with the second user.

14. A method for hiring users, the method comprising;
rendering, on a first display of a first device, a candidate registration user interface (UI), wherein the first device is associated with a first user;
receiving, via the candidate registration UI, a first set of registration details associated with the first user, wherein a format for the first set of registration details corresponds to at least one of: a text format, an image format, or a document-based format;
rendering, on the first display, a cover letter UI, wherein the cover letter UI is different from the candidate registration UI;
receiving, via the cover letter UI, at least cover letter data associated with the first user, wherein the format of the cover letter data corresponds to an audio;
rendering, on the first display, a pitch room UI;
receiving, via the pitch room UI, at least pitch data associated with the first user, wherein the format of the pitch data corresponds to at least a video;
providing the received first set of registration details, the cover letter data and the pitch data to a second device associated with a second user;
rendering, on a second display of the second device, a decision UI;
receiving, via a decision UI element displayed on the decision UI, at least an input from the second user, wherein the input corresponds to a decision associated with the hiring of the first user, based on at least one of: the received first set of registration details, the cover letter data, or the pitch data;
generating a notice of decision based on the input received from the second user on the rendered decision UI; and
providing, on the first display, the generated notice of decision.

15. The method of claim 14, further comprising:
receiving, via a first UI element of the candidate registration UI, an information document associated with the first user;
retrieving the first set of registration details associated with the first user from the received information document; and
receiving, via a second UI element of the candidate registration UI, an input corresponding to one of acceptance, rejection, or modification of the retrieved first set of registration details.

16. The method of claim 14, further comprising receiving, via the pitch room UI, industry relevant data associated with the first user, wherein the format of the industry relevant data corresponds to at least the video.

17. The method of claim 14, further comprising:
rendering the pitch room UI as a virtual reality (VR) environment; and
receiving at least pitch data comprising at least a VR object associated with the first user in the rendering pitch room.

18. The method of claim 14, wherein the generated notice of decision corresponds to at least one of selection of the first user, rejection of the first user or decision of the selection or the rejection of the first user on hold.

19. The method of claim 17, further comprising:
generating a notification based on a determination that at least pitch data associated with the first user is accessed by the second user; and
providing the generated notification on the first display.

20. A computer programmable product comprising a non-transitory computer readable medium having stored thereon computer executable instruction which when executed by one or more processors, cause one or more processors to carry out operations for hiring users, the operations comprising:
rendering, on a first display of a first device, a candidate registration user interface (UI), wherein the first device is associated with a first user; receiving, via the candidate registration UI, a first set of registration details associated with the first user, wherein a format of the first set of registration details corresponds to at least one of: a text format, an image format, or a document-based format;
rendering, on the first display, a cover letter UI, wherein the cover letter UI is different from the candidate registration UI;
receiving, via the cover letter UI, at least cover letter data associated with the first user, wherein the format of the cover letter data corresponds to an audio;
rendering, on the first display, a pitch room UI;
receiving, via the pitch room UI, at least pitch data associated with the first user, wherein the format of the pitch data corresponds to at least a video:
providing the received first set of registration details, the cover letter data, and the pitch data to a second device associated with a second user;
rendering, on a second display of the second device, a decision UI;
receiving, via a decision UI element displayed on the decision UI, at least an input from the second user, wherein the input corresponds to a decision associated with the hiring of the first user, based on at least one of: the received first set of registration details, the cover letter data, or the pitch data;
generating a notice of decision based on the input received from the second user on the rendered decision UI; and
providing, on the first display, the generated notice of decision.

* * * * *